(12) United States Patent
Huang et al.

(10) Patent No.: US 9,991,715 B1
(45) Date of Patent: Jun. 5, 2018

(54) MAXIMUM POWER POINT TRACKING METHOD AND APPARATUS

(71) Applicants: INDUSTRIAL TECHNOLOGY RESEARCH INSTITUTE, Hsinchu (TW); INTEL CORPORATION, Santa Clara, CA (US)

(72) Inventors: Chao-Jen Huang, Taichung (TW); Ching-Ju Lin, Hsinchu (TW); Su-Hwan Kim, Santa Clara, CA (US)

(73) Assignees: Industrial Technology Research Institute, Chutung Township, Hsinchu (TW); Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/454,588

(22) Filed: Mar. 9, 2017

(51) Int. Cl.
*G05F 1/00* (2006.01)
*H02M 1/00* (2006.01)
*H02J 3/38* (2006.01)
*H02M 3/158* (2006.01)
*H02M 7/04* (2006.01)
*H02M 1/08* (2006.01)

(52) U.S. Cl.
CPC .............. *H02J 3/382* (2013.01); *H02J 3/385* (2013.01); *H02J 3/387* (2013.01); *H02M 1/08* (2013.01); *H02M 3/1582* (2013.01); *H02M 7/04* (2013.01); *H02M 2001/0009* (2013.01)

(58) Field of Classification Search
CPC .................................. G05F 1/67; H02M 3/157
USPC ............ 323/241, 266, 274, 283–285; 363/78
See application file for complete search history.

(56) References Cited

U.S. PATENT DOCUMENTS

| 7,595,623 | B2 | 9/2009 | Bennett |
| 8,339,112 | B2 | 12/2012 | Rua et al. |
| 9,000,748 | B2 * | 4/2015 | Huang ...................... G05F 1/67 323/283 |
| 9,063,559 | B2 | 6/2015 | Ivanov et al. |
| 9,065,336 | B2 | 6/2015 | Huang et al. |

(Continued)

FOREIGN PATENT DOCUMENTS

| CN | 104378059 A | 2/2015 |
| CN | 204304782 U | 4/2015 |

(Continued)

OTHER PUBLICATIONS

Sabir Messalti et al., A New Neural Networks MPPT controller for PV Systems, 2015 6th International Renewable Energy Congress (IREC), 2015, pp. 1-6, IEEE.

(Continued)

*Primary Examiner* — Gary Nash
(74) *Attorney, Agent, or Firm* — Muncy, Geissler, Olds & Lowe, P.C.

(57) ABSTRACT

A maximum power point tracking method is provided. The method includes the following steps. Perform a power conversion operation by a converter according to a duty cycle signal so as to convert an input power supplied by an energy harvester into an output power, wherein the converter includes an inductor, and a current flowing through the inductor increases in an energy-storing duration and decreases in an energy-releasing duration. Obtain a length of the energy-releasing duration. Adjust the duty cycle signal according to the length of the energy-releasing duration so as to track a maximum power point of the input power or the output power.

18 Claims, 10 Drawing Sheets

(56) References Cited

U.S. PATENT DOCUMENTS

| | | | |
|---|---|---|---|
| 9,257,896 B1* | 2/2016 | Shih | H02M 1/14 |
| 2011/0127927 A1 | 6/2011 | Chen et al. | |
| 2013/0057069 A1 | 3/2013 | Meredith-Jones et al. | |
| 2013/0063117 A1 | 3/2013 | Lee | |
| 2015/0002127 A1* | 1/2015 | Huang | G05F 1/67 323/311 |
| 2015/0069840 A1* | 3/2015 | Teo | G05F 1/67 307/52 |
| 2015/0123649 A1 | 5/2015 | Shao et al. | |
| 2015/0145494 A1* | 5/2015 | Heo | H02M 3/158 323/282 |
| 2015/0168980 A1 | 6/2015 | Harrison | |
| 2015/0188415 A1 | 7/2015 | Abido et al. | |
| 2015/0270779 A1 | 9/2015 | Im et al. | |
| 2015/0372596 A1 | 12/2015 | McJimsey et al. | |
| 2016/0197508 A1 | 7/2016 | Kruiskamp | |

FOREIGN PATENT DOCUMENTS

| | | |
|---|---|---|
| EP | 2607980 A1 | 6/2013 |
| TW | 201123692 A | 7/2011 |
| TW | 201220014 A | 5/2012 |
| TW | 201236334 A | 9/2012 |
| TW | 201324074 A | 6/2013 |
| TW | 20134205 A | 8/2013 |
| TW | 201500883 A | 1/2015 |
| TW | 201507360 A | 2/2015 |

OTHER PUBLICATIONS

Young-Ho Kim et al., Flyback Inverter using Voltage Sensorless MPPTfor AC Module Systems, The 2010 International Power Electronics Conference, 2010, pp. 948-953, IEEE.

Satyajit Mohanty et al., A New MPPT Design Using Grey Wolf Optimization Technique for Photovoltaic System Under Partial Shading Conditions, IEEE Transactions on Sustainable Energy, Jan. 2016, pp. 181-188, vol. 7, No. 1, IEEE.

Ko Ko Win et al., An Optimized MPPT Circuit for Thermoelectric Energy Harvester for Low Power Applications, 8th International Conference on Power Electronics—ECCE Asia, May 30-Jun. 3, 2011, pp. 1579-1584, Th11-5, IEEE, The Shilla Jeju, Korea.

M. Zigliotto et al., A fast-MPPT low-complexity autonomous PV water pumping scheme for PMSM, $3^{rd}$ Renewable Power Generation Conference RPG 2014), Sep. 24-25, 2014, pp. 1-6, Naples, Italy.

Sergei Kolesnik et al., On the Equivalence of Major Variable-Step-Size MPPT Algorithms, IEEE Journal of Photovoltaics, Mar. 2016, pp. 590-594, vol. 6, No. 2, IEEE.

Eman Goma et al., Single-Output-Sensor On-Chip Integrated MPPT for PV Solar System Power Management, 2014,pp. 655-661,IEEE.

Matthew Bond et al., Current-Sensorless Power Estimation and MPPT Implementation for Thermoelectric Generators, IEEE Transactions on Industrial Electronics, Sep. 2015, pp. 5539-5548, vol. 62, No. 9, IEEE.

Hadeed Ahmed Sher et al., A New Sensorless Hybrid MPPT Algorithm Based on Fractional Short-Circuit Current Measurement and P&O MPPT, IEEE Transactions on Sustainable Energy, Oct. 2015, pp. 1426-1434, vol. 6, No. 4, IEEE.

Ali F Murtaza et al.., A Novel Hybrid MPPT Technique for Solar PV Applications Using Perturb & Observe and Fractional Open Circuit Voltage Techniques, 2012 15th International Symposium MECHATRONIKA, pp. 1-8, Dec. 5-7, 2012, IEEE.

Hadeed A Sher et al., A New Irradiance Sensorless Hybrid MPPT Technique for Photovoltaic Power Plants, 2014, pp. 1919-1923, IEEE.

* cited by examiner

MAXIMUM POWER POINT TRACKING METHOD AND APPARATUS

TECHNICAL FIELD

The disclosure relates in general to maximum power point tracking method and apparatus applied to an energy harvester.

BACKGROUND

With the development of Internet of Things (IoT), which involves internetworking of physical devices, it is important for a physical device to have a long lifetime. As most IoT devices rely on battery, the demand for batteries increases significantly and thus raises environmental issues. A technique called energy harvesting has been developed to reduce the demand for batteries in IoT devices. Energy harvesters, such as photovoltaic cells, thermoelectric generators, and piezoelectric generators, have been widely used and researched. In particular, photovoltaic cells are used in indoor light energy harvesting applications and thermoelectric generators are used in room temperature energy harvesting applications. In order to effectively charge the system powered by the energy harvester, a maximum power point tracking (MPPT) technique may be adopted to control the energy harvester to supply the maximum power, hence enhancing energy harvesting efficiency and reducing the charging time.

SUMMARY

The disclosure is directed to maximum power point tracking method and apparatus.

According to one embodiment, a maximum power point tracking method is provided. The method includes the following steps. Perform a power conversion operation by a converter according to a duty cycle signal so as to convert an input power supplied by an energy harvester into an output power, wherein the converter includes an inductor, and a current flowing through the inductor increases in an energy-storing duration and decreases in an energy-releasing duration. Obtain a length of the energy-releasing duration. Adjust the duty cycle signal according to the length of the energy-releasing duration so as to track a maximum power point of the input power or the output power.

According to another embodiment, a maximum power point tracking apparatus. The maximum power point tracking apparatus includes a converter and a controller. The converter is configured to perform a power conversion operation according to a duty cycle signal so as to convert an input power supplied by an energy harvester into an output power. The converter includes an inductor, and a current flowing through the inductor increases in an energy-storing duration and decreases in an energy-releasing duration. The controller is configured to obtain a length of the energy-releasing duration, and adjust the duty cycle signal according to the length of the energy-releasing duration so as to track a maximum power point of the input power or the output power.

Figure 1:
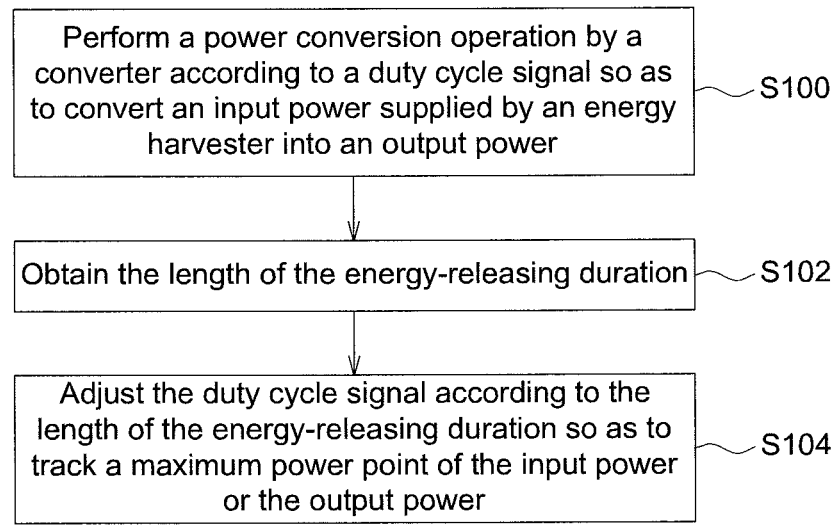
FIG. 1 shows a flowchart of a maximum power point tracking method according to an embodiment of this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a flowchart of a maximum power point tracking method according to an embodiment of this disclosure. The method includes the following steps. Step S100: Perform a power conversion operation by a converter according to a duty cycle signal so as to convert an input power supplied by an energy harvester into an output power. The converter includes an inductor. The current flowing through the inductor increases in an energy-storing duration and decreases in an energy-releasing duration. Step S102: Obtain a length of the energy-releasing duration. Step S104: Adjust the duty cycle signal according to the length of the energy-releasing duration so as to track a maximum power point of the input power or the output power.

Figure 2A:
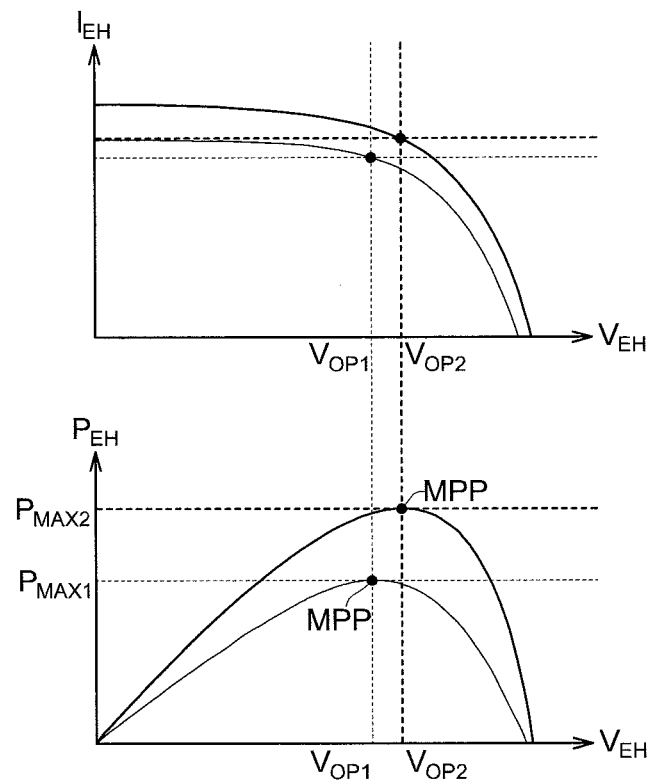
FIG. 2A shows an example of the maximum power point in a kind of energy harvesters, such as a photovoltaic cell.
Figure 2B:
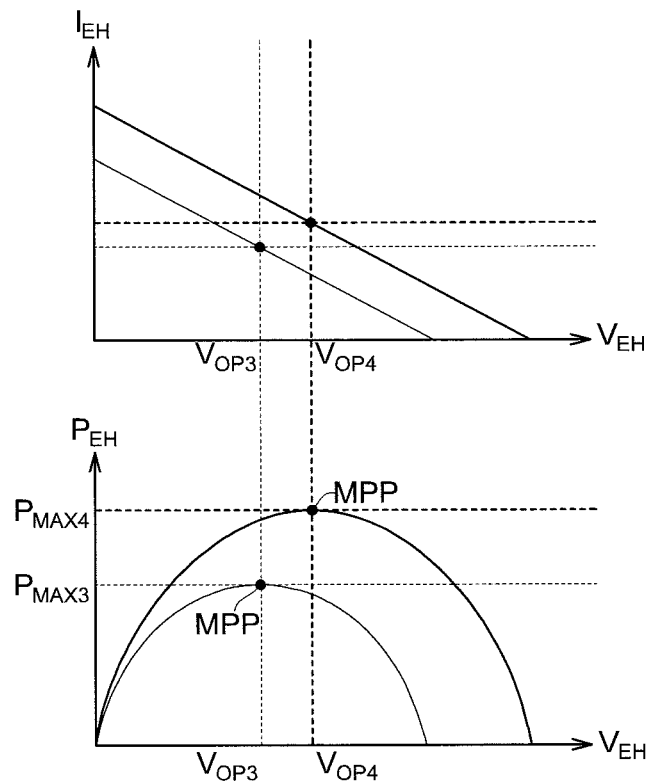
FIG. 2B shows an example of the maximum power point in a kind of energy harvesters, such as a thermoelectric generator.

In one embodiment, the energy harvester may be a photovoltaic cell, a thermoelectric energy source, a fuel cell, a direct-current (DC) type energy harvester, or an alternating-current (AC) type energy harvester coupled to a rectifier. For example, the photovoltaic cell and the thermoelectric energy source belong to the DC type energy harvester. Note that the AC type energy harvester may also be applicable by incorporating a rectifier, which converts alternating current to direct current. The AC type energy harvesters may include electro-dynamic generators, piezoelectric energy harvesters, or radio-frequency antennas. Please refer to FIG. 2A and FIG. 2B for an example of the maximum power point in the photovoltaic cell and the thermoelectric generator source. FIG. 2A shows an example of the maximum power point in a kind of energy harvesters. In the upper part of the FIG. 2A shows a characteristic curve of the output current $I_{EH}$ versus the output voltage $V_{EH}$ of an energy harvester. In the lower part of the FIG. 2A shows a corresponding characteristic curve of the output power $P_{EH}$ versus the output voltage $V_{EH}$ of the energy harvester. Two different curves shown in FIG. 2A represent two different operating conditions, such as different temperature, pressure, or illumination. It can be seen that the larger the output voltage $V_{EH}$ is, the smaller the output current $I_{EH}$ is. When the output voltage $V_{EH}$ of the energy harvester is set at an operation voltage $V_{OP1}$ (or $V_{OP2}$), the output power $P_{EH}$ achieves the maximum power value $P_{MAX1}$ (or $P_{MAX2}$) in the respective operating condition. Such operating point is called the maximum power point (MPP). Similarly, FIG. 2B shows an example of the maximum power point in a kind of thermoelectric generators or photovoltaic cells, where two different curves represent two different operating conditions. The output current $I_{EH}$ decreases as the output voltage $V_{EH}$ increases. When the output voltage $V_{EH}$ of the thermoelectric energy source is set at an operation voltage $V_{OP3}$ (or $V_{OP4}$), the output power $P_{EH}$ achieves the maximum power value $P_{MAX3}$ (or $P_{MAX4}$) in the respective operating condition. The objective of the maximum power point tracking method is to find out the MPP as shown in FIG. 2A and FIG. 2B.

Figure 3:
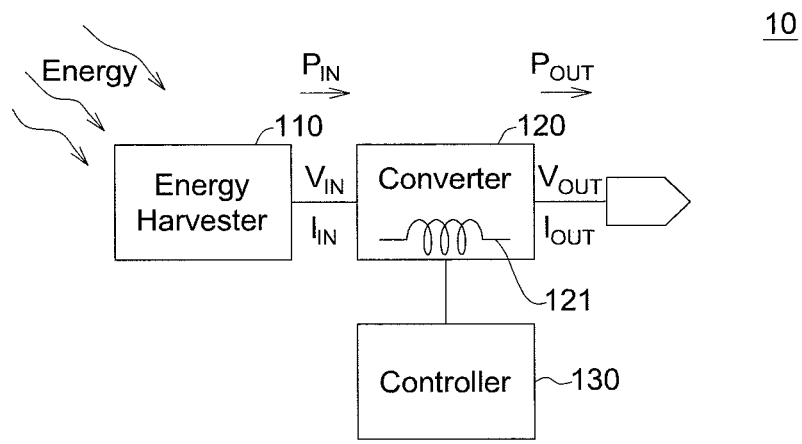
FIG. 3 shows a diagram illustrating a maximum power point apparatus according to an embodiment of this disclosure.

FIG. 3 shows a diagram illustrating a maximum power point apparatus according to an embodiment of this disclosure. The maximum power point tracking apparatus 10 includes a converter 120 and a controller 130. The converter 120 is configured to perform a power conversion operation according to a duty cycle signal so as to convert an input power $P_{IN}$ supplied by an energy harvester 110 into an output power $P_{OUT}$. The converter 120 includes an inductor 121, and a current flowing through the inductor 121 increases in an energy-storing duration and decreases in an energy-releasing duration. The controller 130 is configured to obtain a length of the energy-releasing duration, and adjust the duty cycle signal according to the length of the energy-releasing duration so as to track the maximum power point of the input power $P_{IN}$ or the output power $P_{OUT}$.

As shown in FIG. 3, the controller 130 is coupled to the converter 120. It is noted that the connection between the controller 130 and the converter 120 may include more than one signal wires. For example, the controller 130 may provide the duty cycle signal to the converter 120 to control the power conversion operation, and the converter 120 may provide information about the length of the energy-releasing duration to the controller 130. In one embodiment, the converter 120 may include a DC-DC converter, such as a synchronous DC-DC converter or an asynchronous DC-DC converter. For example, the converter 120 may be a buck converter (step-down converter), a boost converter (step-up converter), a buck-boost converter, a flyback converter, a forward converter, a SEPIC converter (Single-Ended Primary Inductance Converter), or a Ćuk converter. The converter 120 uses an inductor 121 inside the converter 120 to perform the power conversion operation according to the duty cycle signal. Examples of the energy storing operation and energy releasing operation of a DC-DC converter having an inductor are given below.

Figure 4A:
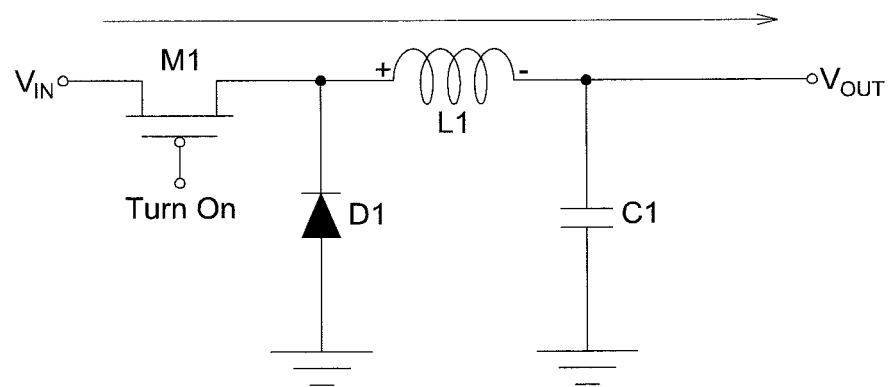
FIG. 4A shows a diagram illustrating an example buck converter operated in an energy-storing duration.
Figure 4B:
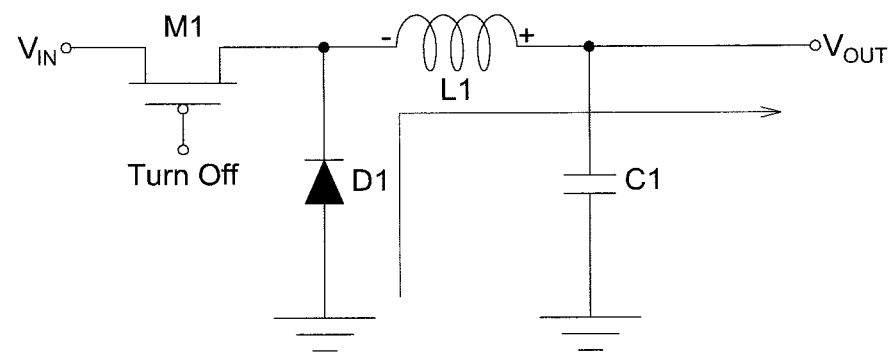
FIG. 4B shows a diagram illustrating an example buck converter operated in an energy-releasing duration.

FIG. 4A shows a diagram illustrating an example buck converter operated in an energy-storing duration. The buck converter 120d in this embodiment includes a transistor M1, a diode D1, an inductor L1, and a capacitor C1. The gate terminal of the transistor M1 may be coupled to the duty cycle signal to control the energy-storing and the energy-releasing operation of the buck converter 120d. In the energy-storing duration, the transistor M1 is turned on, the current flows in the direction shown in FIG. 4A. The left end of the inductor L1 has a higher voltage than the right end of the inductor L1, and hence the current flowing through the inductor L1 increases in the energy-storing duration ( $$v = L\frac{di}{dt}$$

for an inductor). FIG. 4B shows a diagram illustrating an example buck converter operated in an energy-releasing duration. The transistor M1 is turned off, making the current flow in the direction shown in FIG. 4B. The left end of the inductor L1 has a lower voltage than the right end of the inductor L1, and hence the current flowing through the inductor decreases in the energy-releasing duration.

Figure 5A:
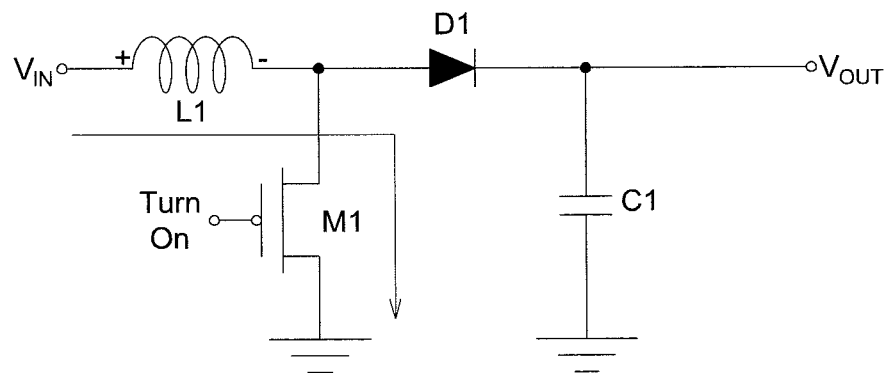
FIG. 5A shows a diagram illustrating an example boost converter operated in an energy-storing duration.
Figure 5B:
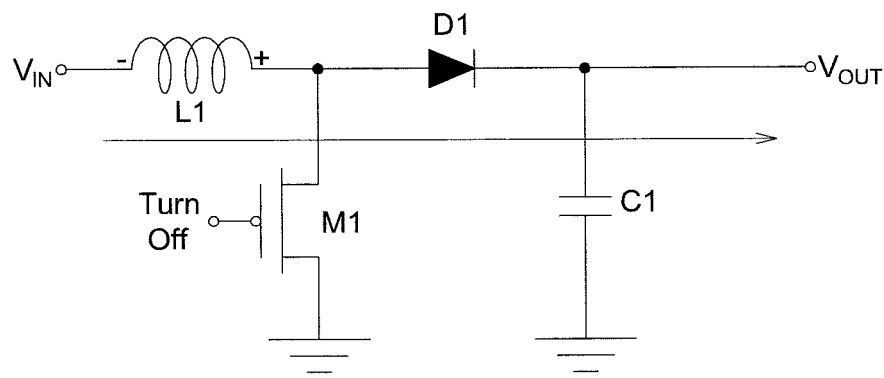
FIG. 5B shows a diagram illustrating an example boost converter operated in an energy-releasing duration.

Similarly, FIG. 5A shows a diagram illustrating an example boost converter operated in an energy-storing duration, and FIG. 5B shows a diagram illustrating an example boost converter operated in an energy-releasing duration. The current flowing through the inductor L1 increases when the transistor M1 in the boost converter 120u is turned on, and the current flowing through the inductor L1 decreases when the transistor M1 in the boost converter 120u is turned off.

Figure 6:
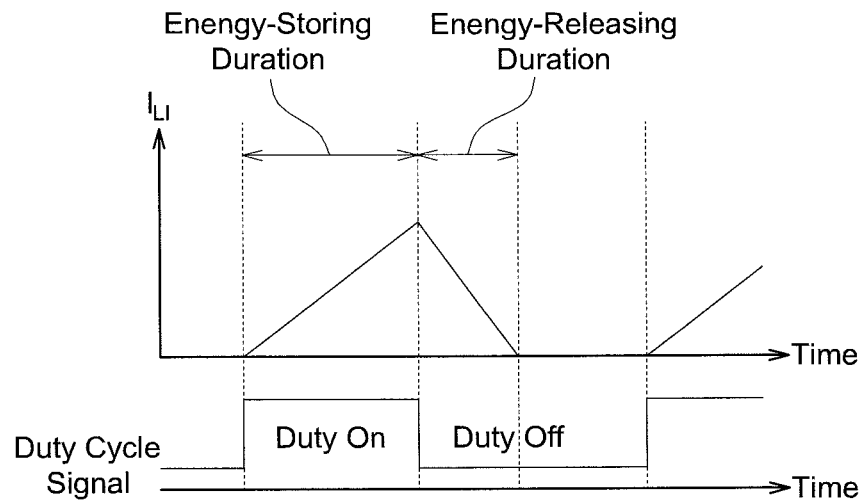
FIG. 6 shows an example waveform illustrating a current flowing through the inductor in the converter.

FIG. 6 shows an example waveform illustrating a current flowing through the inductor in the converter. The converter may be a buck converter 120d in FIG. 4A, a boost converter 120u in FIG. 5A, or other DC-DC converters including an inductor. In the lower part of FIG. 6 shows the duty cycle signal having a duty cycle that controls the energy-storing operation and the energy-releasing operation. The duty cycle of the duty cycle signal may be adjusted to affect the length of the energy-storing duration. The inductor current $I_{L1}$ continues to increase until the duty-on duration ends. The duration in which the inductor current $I_{L1}$ gradually increases may be referred as the energy-storing duration. The inductor current $I_{L1}$ reaches a maximum current at the end of the energy-storing duration. After that, the inductor current $I_{L1}$ starts to decrease until the inductor current $I_{L1}$ reaches zero. Note that the zero current here is merely one example implementation for purpose of clear illustration. The zero current may be replaced by other reference current values in alternative embodiments. The duration in which the inductor current $I_{L1}$ decreases from the maximum current to the zero current may be referred as the energy-releasing duration, as shown in FIG. 6.

Refer to the maximum power point tracking apparatus 10 in FIG. 3. The input power $P_{IN}$ ($P_{IN}=V_{IN}\times I_{IN}$) is proportional to the input current Hence the input power $P_{IN}$ may be determined by obtaining the current flowing through the inductor 121 in the converter 120. Refer to the waveform shown in FIG. 6, the larger the maximum current level of the inductor current $I_{L1}$ is, the larger the input power $P_{IN}$ is. The decrease rate of the inductor current $I_{L1}$ (i.e. the negative slope in the energy-releasing duration in FIG. 6) is proportional to the voltage difference across the inductor 121

$$\left(v = L\frac{di}{dt}\right).$$

As such, if the voltage difference across the inductor 121 in FIG. 3 is maintained in the energy-releasing duration, the maximum current level of the inductor current $I_L$ (the current flowing through the inductor 121) may be determined by obtaining the length of the energy-releasing duration. In one embodiment, the converter 120 and/or the controller 130 may be configured to maintain the voltage difference across the inductor 121 in the energy-releasing duration. Consequently, the input power $P_{IN}$ supplied by the energy harvester 110 may be determined simply based on the length of the energy-releasing duration. The controller 130 may be configured to obtain the length of the energy-releasing duration, and adjust the duty cycle signal according to the length of the energy-releasing duration so as to track a maximum power point of the input power $P_{IN}$ or the output power $P_{OUT}$.

In one embodiment, the converter 120 may include a zero-current detector which is coupled to the inductor 121. The zero-current detector is configured to generate a time information signal $T_{RES}$ related to the energy-releasing duration. Refer to the waveform shown in FIG. 6, the zero-current detector is capable of detecting when the inductor current $I_{L1}$ reaches zero, and thus outputting the time information signal $T_{RES}$ accordingly to indicate the length of the energy-releasing duration.

Figure 7:
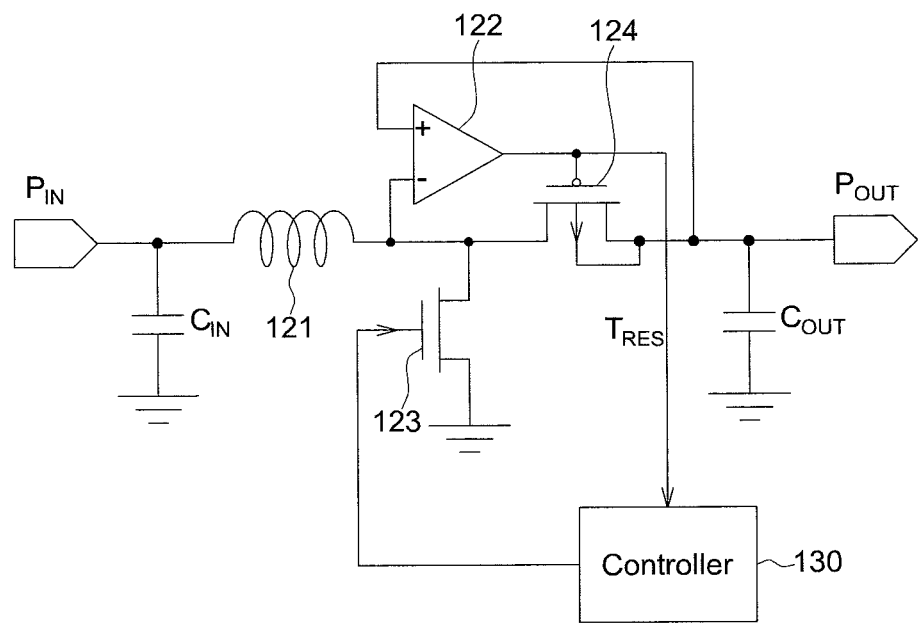
FIG. 7 shows a diagram illustrating an example converter structure according to an embodiment of this disclosure.

There may be several implementations for the zero-current detector (ZCD). FIG. 7 shows a diagram illustrating a converter structure according to an embodiment of this disclosure. In this embodiment, the zero-current detector includes a comparator 122. The comparator 122 compares the two voltage levels at the two terminals of the transistor 124, and generates an output result to control the transistor 124. The output result generated by the comparator 122 is the time information signal $T_{RES}$ and is sent to the controller 130. The controller 130 adjusts the duty cycle signal that controls the transistor 123 according to time information signal $T_{RES}$ which indicates the length of the energy-releasing duration.

A boost converter and a zero-current detector including a comparator are used as examples in the embodiment shown in FIG. 7. Note that other types of DC-DC converters and zero-current detectors may also be applicable. There may also be several different approaches for maintaining the voltage difference across the inductor in the energy-releasing duration. For example, by disposing an input capacitor $C_{IN}$ coupled to the inductor 121 with sufficiently large capacitance value as shown in FIG. 7, the voltage level may be kept stable. In addition, the controller 130 may generate an appropriate duty cycle signal such that the voltage level at the other end of the inductor 121 may be kept stable as well.

Figure 8:
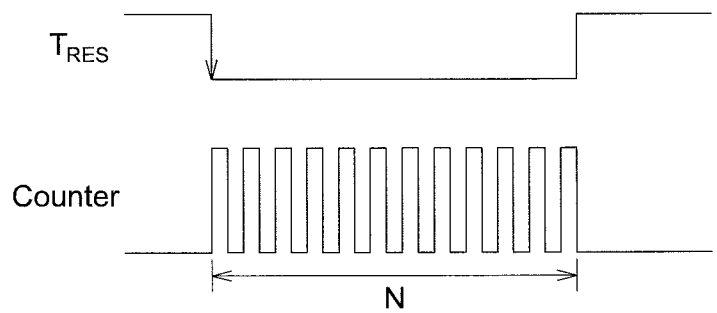
FIG. 8 shows a diagram illustrating a controller structure including a counter according to an embodiment of this disclosure.

The controller 130 receives the time information signal $T_{RES}$. There are several implementations for extracting the length of the energy-releasing duration from the time information signal $T_{RES}$. In one embodiment, the controller 130 includes a counter, such as digital counter that counts with a fixed frequency. The counter may have a counting frequency large enough such that the counter is able to calculate the number of pulses generated by the counter in the energy-releasing duration. FIG. 8 shows a diagram illustrating a controller structure including a counter according to an embodiment of this disclosure. For example, the falling edge of the time information signal $T_{RES}$ may trigger the counter to start counting, and the rising edge of the time information signal $T_{RES}$ may stop counting. The counter then calculates the number of pulses N within the energy-releasing duration. Of course the edge trigger mechanism described here is just for exemplary purposes and can be modified based on the circuit implementation.

Figure 9:
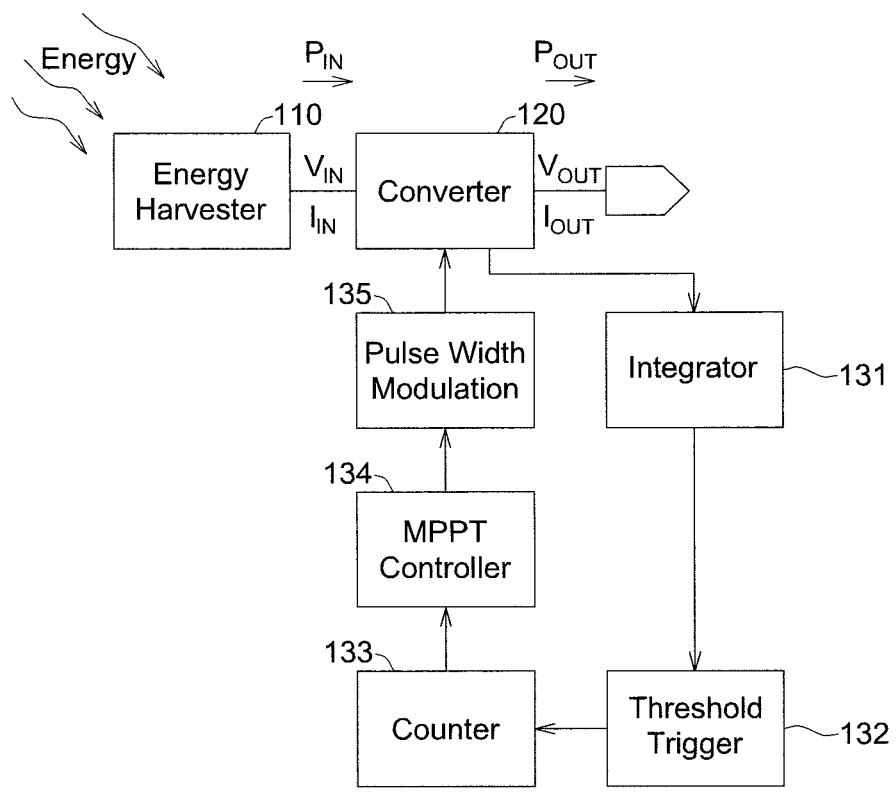
FIG. 9 shows a diagram illustrating a controller structure including an integrator according to an embodiment of this disclosure.

Described above is a digital implementation approach. In another embodiment, an analog approach may be adopted. FIG. 9 shows a diagram illustrating a controller structure including an integrator according to an embodiment of this disclosure. The controller 130 may include an integrator circuit 131, a threshold trigger circuit 132, and a counter circuit 133. The integrator circuit 131 is configured to increase an accumulation voltage in response to the time information signal $T_{RES}$. For example, the integrator circuit 131 may include a capacitor. Initially the capacitor may be discharged to reset the accumulation voltage. The capacitor is then charged during the energy-releasing duration such that the accumulation voltage continues to increase. Such charging operation may be repeated for several cycles, i.e., several energy-releasing durations. In each energy-releasing duration, the accumulation voltage increases an amount that is correlated to the length of the energy-releasing duration. The threshold trigger circuit 132 is configured to compare the accumulation voltage with the threshold voltage, which may be a predetermined value. In other words, the accumulation voltage continues to increase for several cycles until the accumulation voltage exceeds the threshold voltage. The counter circuit 133 is configured to perform a counting operation in response to a comparison result generated by the threshold trigger circuit 132. That is, the counter circuit 133 may count how many cycles are required to make the accumulation voltage larger than the threshold voltage. The larger the counting result is, the more cycles are needed for exceeding the threshold voltage, and hence the smaller the length of the energy-releasing duration is. The controller 130 may also include a MPPT controller 134 and a pulse width modulation circuit 135. The MPPT controller 134 may be configured to execute a MPPT algorithm (such as perturb and observe) according to the counting result generated by the counter circuit 133. The MPPT controller 134 then controls the pulse width modulation circuit 135 to adjust the duty cycle of the duty cycle signal so as to perform the maximum power point tracking operation.

Figure 10:
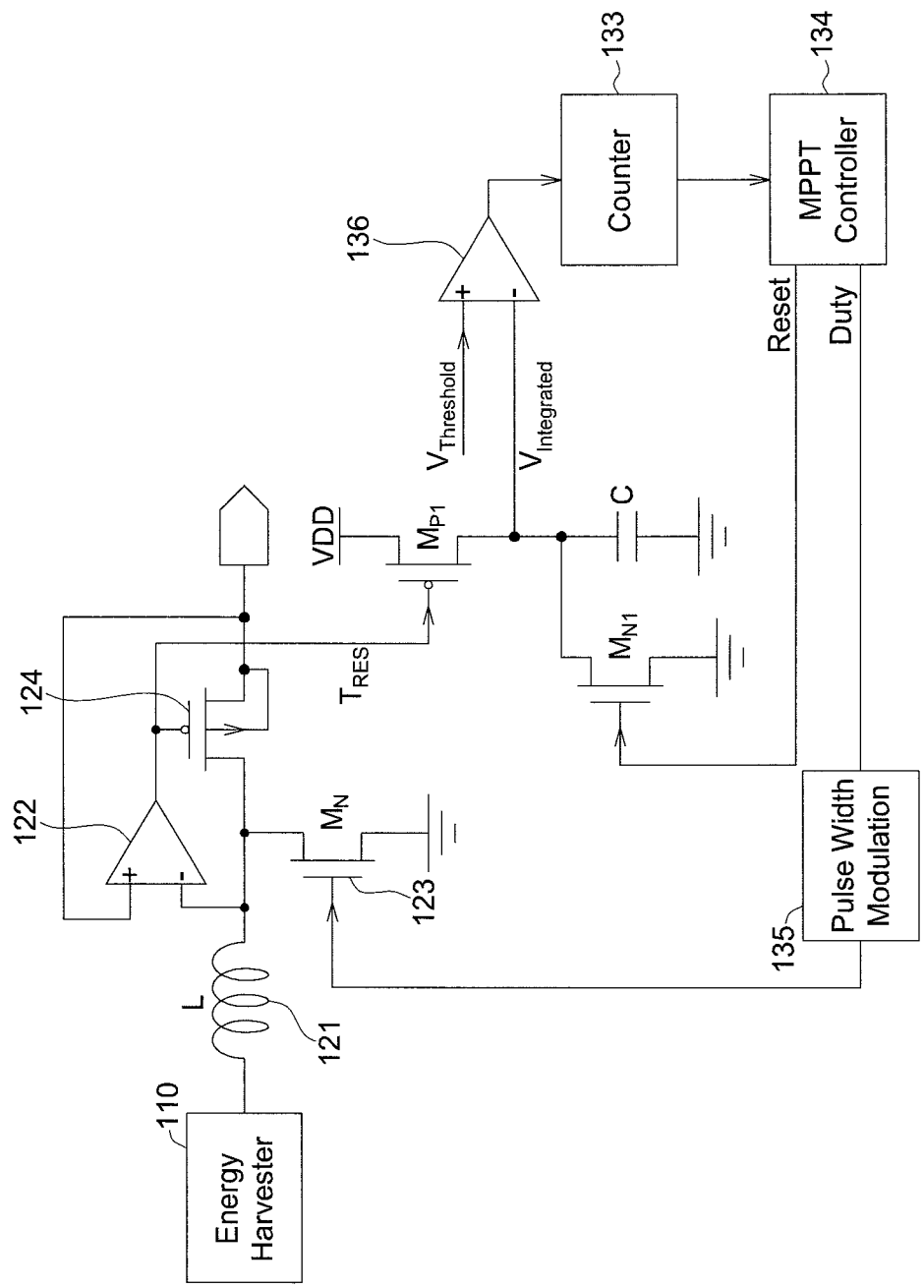
FIG. 10 shows a diagram illustrating a circuit level implementation of the controller according to an embodiment of this disclosure.

FIG. 9 shows an example block diagram of the controller 130. One possible implementation of the controller 130 may be referred to FIG. 10, which shows a diagram illustrating a circuit level implementation of the controller according to an embodiment of this disclosure. The MPPT controller 134 outputs a reset signal to turn on the transistor $M_{N1}$ to discharge the capacitor C and reset the accumulation voltage $V_{Integrated}$. In each energy-releasing duration, the time information signal $T_{RES}$ turns on the transistor $M_{P1}$ to charge the capacitor C by a constant DC current source. A comparator 136 compares the accumulation voltage $V_{Integrated}$ with the threshold voltage $V_{Threshold}$. When the accumulation voltage $V_{Integrated}$ exceeds the threshold voltage $V_{Threshold}$, the comparator 136 informs the counter circuit 133 to stop counting. The MPPT controller 134 outputs a duty value according to the counting result generated by the counter circuit 133.

Duty cycle adjustment is then performed by the pulse width modulation circuit 135 according to the duty value generated by the MPPT controller 134.

Figure 11A:
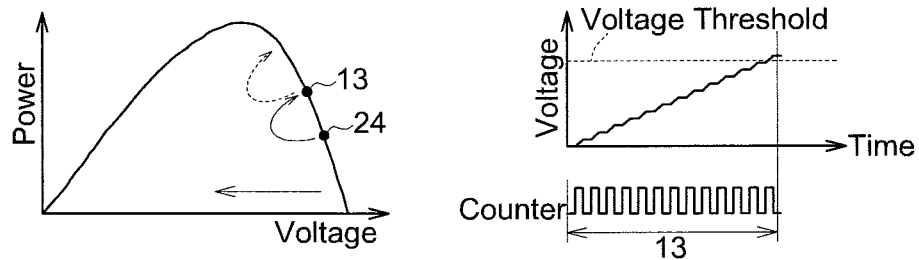
FIGS. 11A-11D show diagrams illustrating a perturb and observe procedure of MPPT according to an embodiment of this disclosure.
Figure 11B:
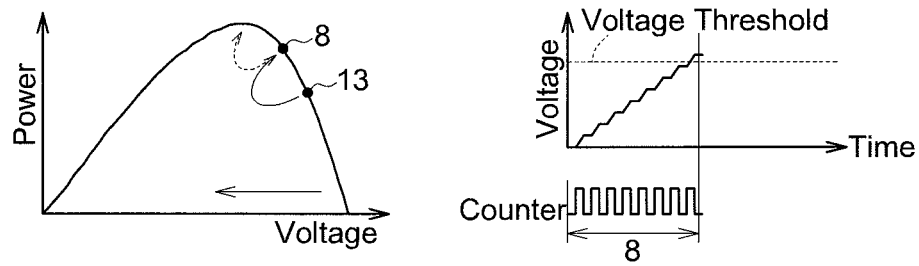
Figure 11C:
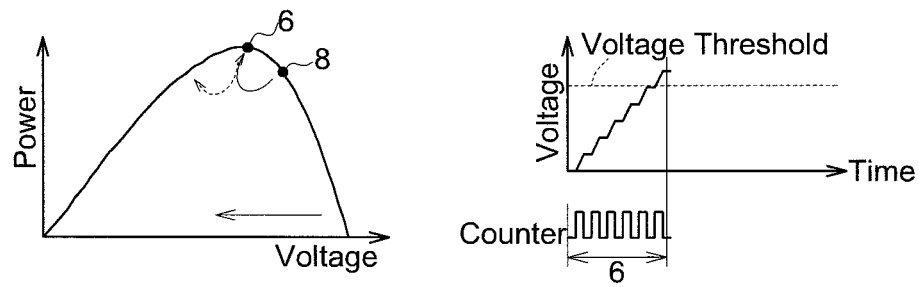
Figure 11D:
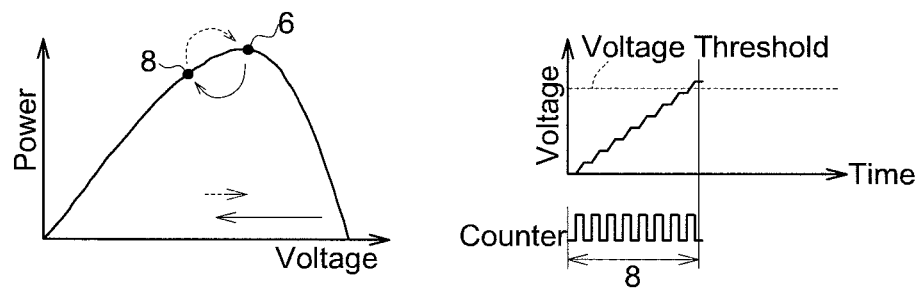

FIGS. 11A-11D show diagrams illustrating a perturb and observe procedure of MPPT according to an embodiment of this disclosure. The circuit used in this example may be the maximum power point tracking apparatus shown in FIG. 9 or FIG. 10, which includes an integrator circuit, a threshold trigger circuit, and a counter circuit. In FIG. 11A, the counting result is 13 (the accumulation voltage exceeds the threshold voltage after 13 cycles). A perturbation is made to change the voltage level of the energy harvester. After the perturbation, the counting result shown in FIG. 11B is 8, representing an increase in the energy-releasing duration and thus an increase in power. The voltage level is then perturbed again, resulting in another counting result 6 as shown in FIG. 11C, indicating an increasing trend in power. Thus the voltage level is still perturbed in the same direction (by decreasing voltage). This time the counting result is 8 as shown in FIG. 11D, indicating a decrease in the energy-releasing duration and thus a decrease in power. Therefore the next perturbation to be made will be in an opposite direction (by increasing voltage, shown in dashed line in FIG. 11D). The procedure shown in FIGS. 11A-11D illustrates an example perturb and observe flow of the maximum power point tracking method using the maximum power point tracking apparatus shown in FIG. 9 or FIG. 10.

Figure 12A:
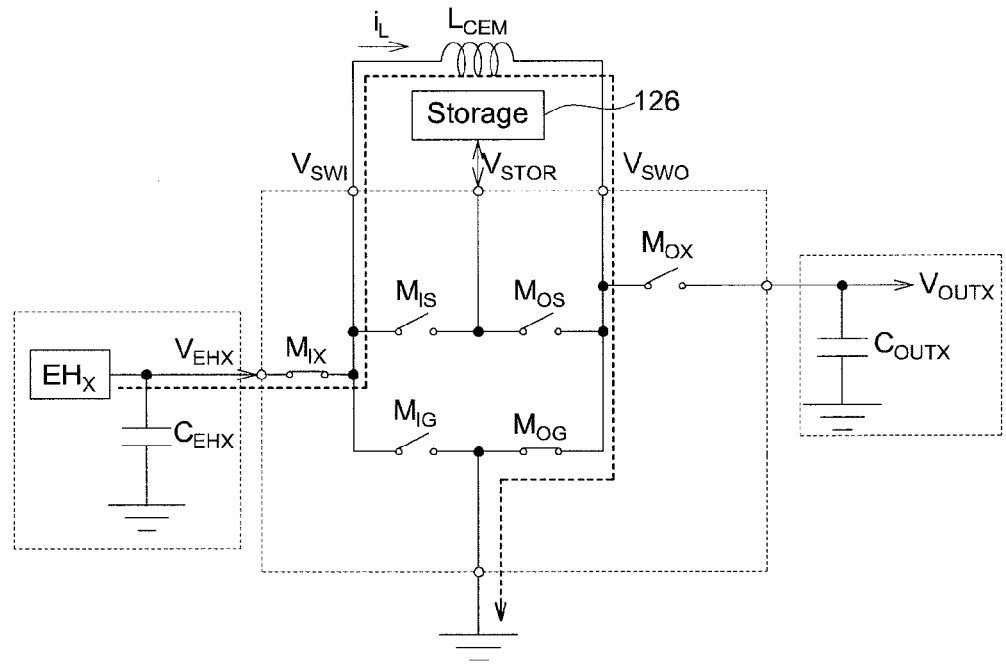
FIG. 12A shows a diagram illustrating a multi-input converter operated in an energy-storing duration according to an embodiment of this disclosure.

There are still other embodiments regarding the converter 120 shown in FIG. 3. FIG. 12A shows a diagram illustrating a multi-input converter operated in an energy-storing duration according to an embodiment of this disclosure. In this embodiment, multiple energy harvesters $EH_X$ (X=1, 2, 3, ..., representing an index of multiple energy harvesters) are coupled to a converter having a single inductor $L_{CEM}$. Only one energy harvester $EH_X$ and one corresponding switch $M_{IX}$ are shown in the figure for clear illustration purpose, there may be multiple energy harvesters indeed. There may also be multiple output load circuits connected to the converter. The energy-storing and the energy-releasing operation may be controlled by one or more duty cycle signals. For example, each energy harvester may be controlled by a respective duty cycle signal. In the energy-storing duration, the switches $M_{IX}$ and $M_{OG}$ are closed while the switches $M_{IG}$ and $M_{OS}$ are open, and energy is stored in the inductor $L_{CEM}$. The current flow in the energy-storing duration is clearly illustrated in FIG. 12A with a dashed arrow.

Figure 12B:
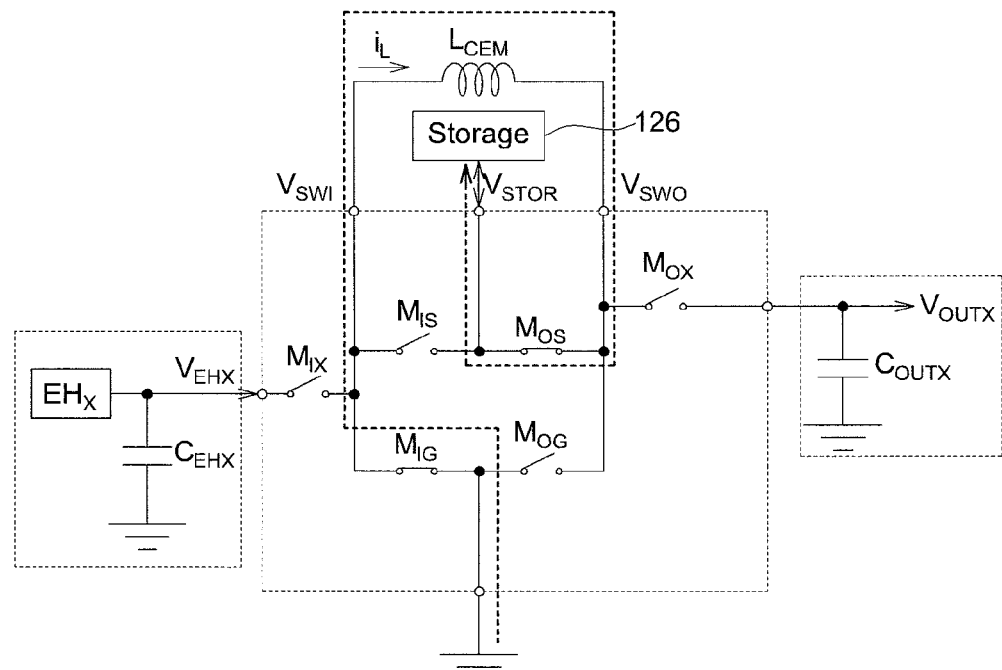
FIG. 12B shows a diagram illustrating a multi-input converter operated in an energy-releasing duration according to an embodiment of this disclosure.

FIG. 12B shows a diagram illustrating a multi-input converter operated in an energy-releasing duration according to an embodiment of this disclosure. In the energy-releasing duration, the switches $M_{IX}$ and $M_{OI}$ are open while the switches $M_{IG}$ and $M_{OS}$ are closed, and energy is transferred from the inductor $L_{CEM}$ to the internal storage 126 inside the converter. For example, the internal storage 126 may provide power to the output circuit when needed. The current flow in the energy-releasing duration is clearly illustrated in FIG. 12B with a dashed arrow. Note that in the energy-releasing duration, one end of the inductor $L_{CEM}$ is coupled to ground, and the other end of the inductor $L_{CEM}$ is coupled to the internal storage 126, which provides a stable voltage level $V_{STOR}$. Therefore the voltage difference across the inductor $L_{CEM}$ is maintained in the energy-releasing duration.

Figure 13:
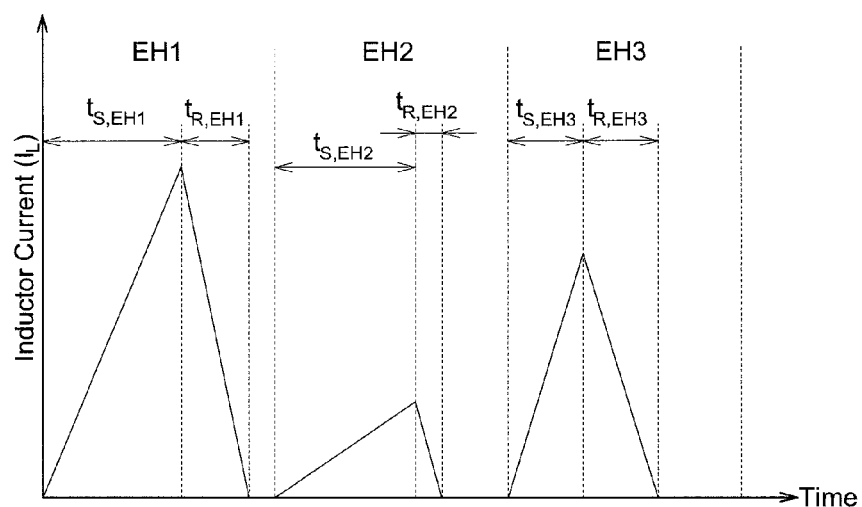
FIG. 13 shows a waveform illustrating a current flowing through the inductor in the multi-input converter according to an embodiment of this disclosure.

FIG. 13 shows a waveform illustrating a current flowing through the inductor in the multi-input converter according to an embodiment of this disclosure. Assume there are three energy harvesters EH1-EH3 connected to the converter shown in FIG. 12A and FIG. 12B, and each energy harvester is operated in succession as shown in FIG. 13. The energy storing rate may be different in these three energy harvesters EH1-EH3 (with different slopes in three energy-storing durations $t_{S,EH1}$, $t_{S,EH2}$, $t_{S,EH3}$). However, the energy releasing rate is the same because the voltage difference across the inductor $L_{CEM}$ is maintained $V_{STOR}$ in the energy-releasing duration. In other words, in these three energy-releasing durations $t_{R,EH1}$, $t_{R,EH2}$, $t_{R,EH3}$, the slope of the inductor current $I_L$ is the same, which is equal to $$\frac{-V_{STOR}}{L_{CEM}}.$$

The length of the energy-releasing duration is proportional to the input power of the converter, and thus maximum power point tracking can be accomplished in each energy harvester EH1-EH3. In addition, by comparing the three energy-releasing durations $t_{R,EH1}$, $t_{R,EH2}$, $t_{R,EH3}$, power level of these three energy harvesters EH1-EH3 can be determined.

According to the maximum power point tracking method and apparatus disclosed herein, the energy-releasing time of the inductor may be used as a criterion to determine the power of the energy harvester. Therefore the circuit structure for the maximum power point tracking is simplified. For example, a multiplier or analog-to-digital converter is not required in the controller circuit. Reduced hardware area is especially important for IoT applications and wearable devices. Moreover, because simply the energy-releasing time is sufficient for determining the power, the operating point for the energy harvester is not restricted in certain regions, and a high dynamic sensing range can be achieved. Still further, due to this simplicity feature, the converter proposed in this disclosure can be easily integrated to form a concentrated energy management converter. For example, the converter shown in FIG. 12A and FIG. 12B can be a concentrated energy management converter integrated with multiple input energy harvesters and multiple output load circuits.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A maximum power point tracking method, comprising:
   performing a power conversion operation by a converter according to a duty cycle signal so as to convert an input power supplied by an energy harvester into an output power, wherein the converter comprises an inductor, and a current flowing through the inductor increases in an energy-storing duration and decreases in an energy-releasing duration;
   obtaining a length of the energy-releasing duration; and
   adjusting the duty cycle signal according to the length of the energy-releasing duration so as to track a maximum power point of the input power or the output power,
   wherein the obtaining the length of the energy-releasing duration comprises:
      generating a time information signal by a zero-current detector coupled to the inductor, wherein the time information signal is related to the energy-releasing duration.

2. The maximum power point tracking method according to claim 1, further comprising:
maintaining a voltage difference across the inductor in the energy-releasing duration.

3. The maximum power point tracking method according to claim 1, wherein the step of adjusting the duty cycle signal according to the length of the energy-releasing duration comprises:
adjusting a duty cycle of the duty cycle signal according to the length of the energy-releasing duration.

4. The maximum power point tracking method according to claim 1, wherein the converter comprises a DC-DC converter.

5. The maximum power point tracking method according to claim 1, wherein the converter is a buck converter, a boost converter, a buck-boost converter, a flyback converter, a forward converter, a SEPIC converter, or a Ćuk converter.

6. The maximum power point tracking method according to claim 1, wherein the energy harvester is a photovoltaic cell, a thermoelectric energy source, a fuel cell, a DC type energy harvester, or an AC type energy harvester coupled to a rectifier.

7. The maximum power point tracking method according to claim 1, wherein the zero-current detector comprises a comparator.

8. The maximum power point tracking method according to claim 1, wherein the step of obtaining the length of the energy-releasing duration further comprises:
calculating, by a counter, a number of pulses generated by the counter in the energy-releasing duration.

9. The maximum power point tracking method according to claim 1, wherein the step of obtaining the length of the energy-releasing duration further comprises:
increasing an accumulation voltage in response to the time information signal;
comparing the accumulation voltage with a threshold voltage; and
performing a counting operation in response to a comparison result of the step of comparing the accumulation voltage with the threshold voltage.

10. A maximum power point tracking apparatus, comprising:
a converter, configured to perform a power conversion operation according to a duty cycle signal so as to convert an input power supplied by an energy harvester into an output power, wherein the converter comprises an inductor, and a current flowing through the inductor increases in an energy-storing duration and decreases in an energy-releasing duration; and
a controller, configured to obtain a length of the energy-releasing duration, and adjust the duty cycle signal according to the length of the energy-releasing duration so as to track a maximum power point of the input power or the output power,
wherein the converter comprises a zero-current detector, coupled to the inductor, wherein the zero-current detector is configured to generate a time information signal related to the energy-releasing duration.

11. The maximum power point tracking apparatus according to claim 10, wherein the converter is configured to maintain a voltage difference across the inductor in the energy-releasing duration.

12. The maximum power point tracking apparatus according to claim 10, wherein the controller is configured to adjust a duty cycle of the duty cycle signal according to the length of the energy-releasing duration.

13. The maximum power point tracking apparatus according to claim 10, wherein the converter comprises a DC-DC converter.

14. The maximum power point tracking apparatus according to claim 10, wherein the converter is a buck converter, a boost converter, a buck-boost converter, a flyback converter, a forward converter, a SEPIC converter, or a Ćuk converter.

15. The maximum power point tracking apparatus according to claim 10, wherein the energy harvester is a photovoltaic cell, a thermoelectric energy source, a fuel cell, a DC type energy harvester, or an AC type energy harvester coupled to a rectifier.

16. The maximum power point tracking apparatus according to claim 10, wherein the zero-current detector comprises a comparator.

17. The maximum power point tracking apparatus according to claim 10, wherein the controller comprises a counter, configured to calculate a number of pulses generated by the counter in the energy-releasing duration.

18. The maximum power point tracking apparatus according to claim 10, wherein the controller comprises:
an integrator circuit, configured to increase an accumulation voltage in response to the time information signal;
a threshold trigger circuit, configured to compare the accumulation voltage with a threshold voltage; and
a counter circuit, configured to perform a counting operation in response to a comparison result generated by the threshold trigger circuit.

* * * * *